Oct. 20, 1936.  J. F. DUBY  2,058,066
WHEEL ALIGNING DEVICE
Filed March 16, 1936  2 Sheets-Sheet 1
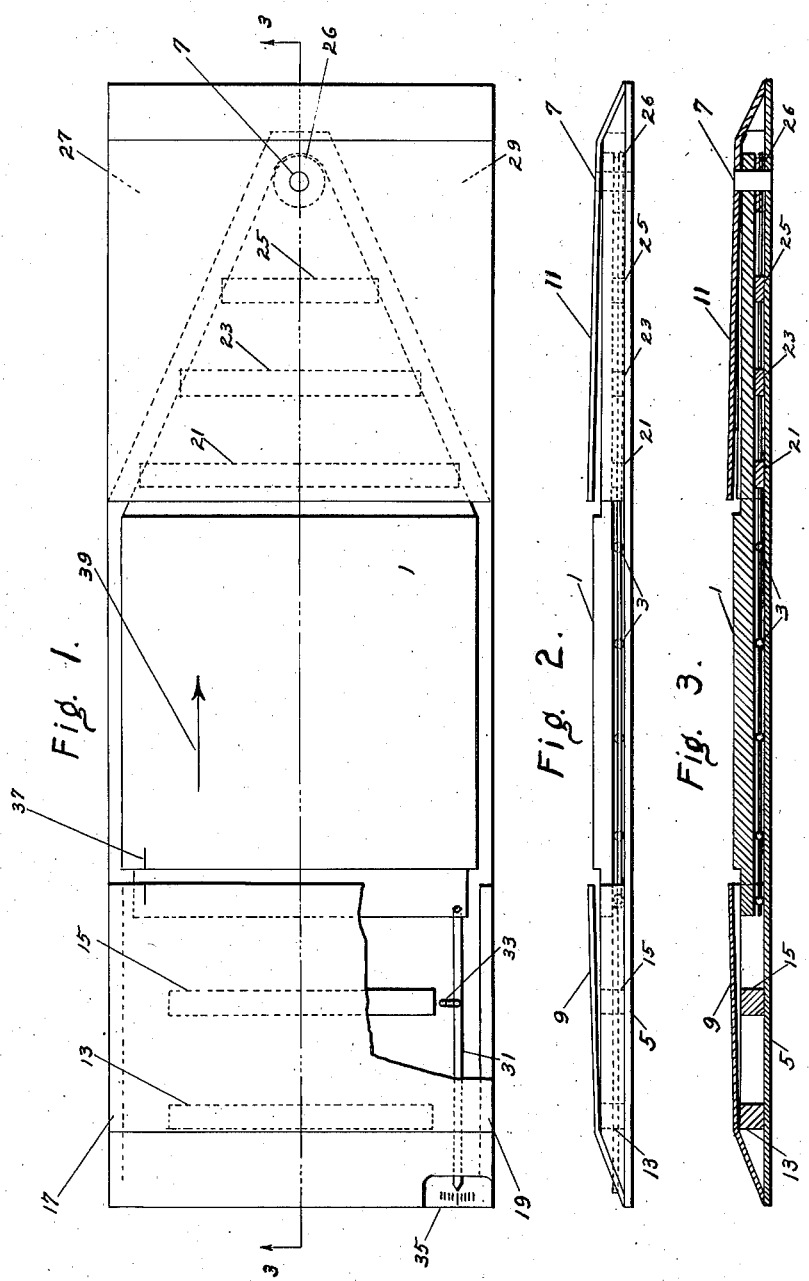
INVENTOR
John F. Duby Oct. 20, 1936.  J. F. DUBY  2,058,066
WHEEL ALIGNING DEVICE
Filed March 16, 1936  2 Sheets-Sheet 2
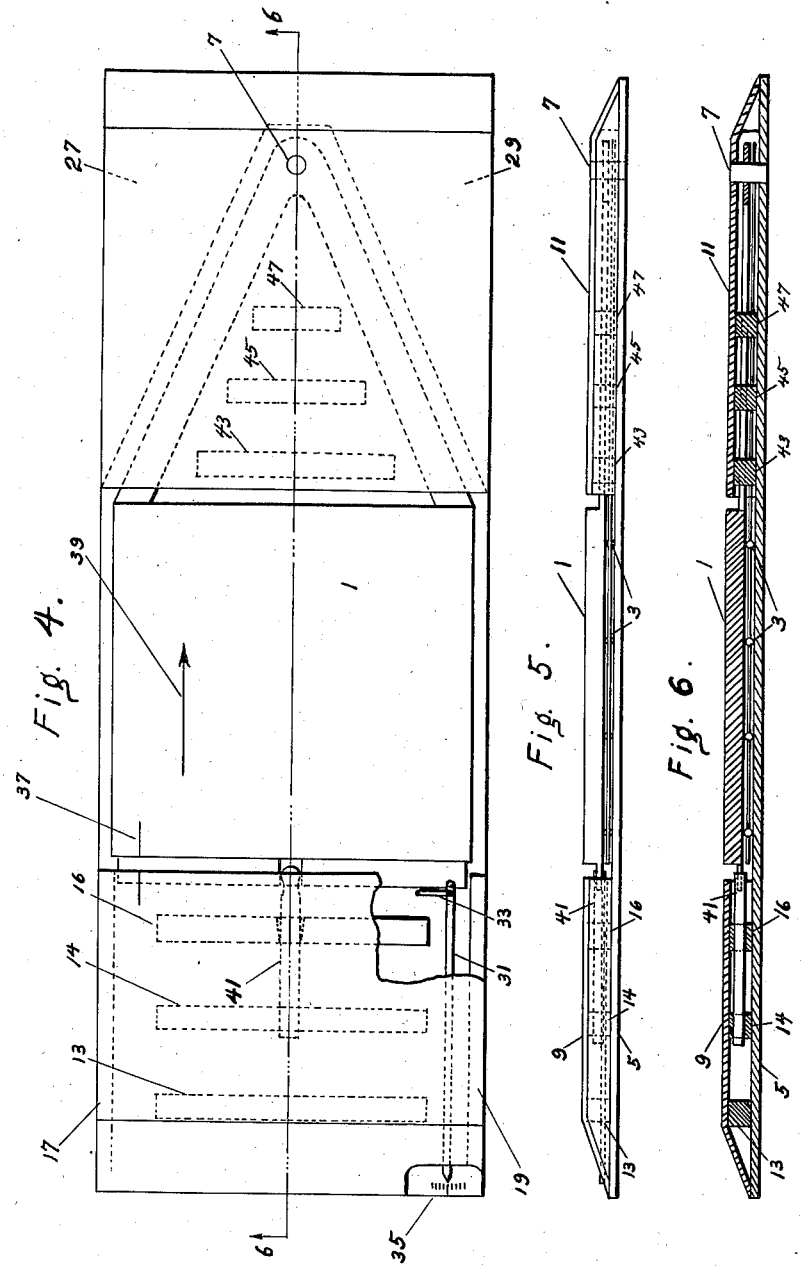
INVENTOR.
John F. Duby Patented Oct. 20, 1936

2,058,066

UNITED STATES PATENT OFFICE 2,058,066

WHEEL ALIGNING DEVICE

John Fabien Duby, Boston, Mass.

Application March 16, 1936, Serial No. 69,061

13 Claims. (Cl. 33—203)

My invention relates to improvements in wheel aligning devices, and particularly to methods and means for eliminating errors which are common on those types of gages that are actuated by side thrust forces exerted by a wheel on its supported surface.

In order that those schooled in the art may readily understand the aims and purposes of this invention I herewith set forth briefly the nature of the errors which my invention will eliminate or reduce to a negligible amount.

When a pair of wheels are adjusted with respect to each other so that their horizontal diameters are parallel but their vertical diameters tipped away from each other at the top, as in camber, the tendency for the wheels to be closer together at bottom center than at the forward and back ends of the area of contact causes a distortional side thrust force to be built up within each tire as the wheels are rolled either forward or backward. This force is built up gradually during the first half of the period of contact, is at its maximum at bottom center, and is dispelled during the second half of the period of contact. It is entirely independent of the well known tendency for a wheel to roll in a circle when it is tipped away from vertical by camber. This lateral distortion, unlike toe-in or toe-out distortions, does not cause any sideways scuffing action, but it has been one of the major causes of error when testing wheel alignment on the movable platform and the pivoted runner board type of wheel aligning devices. The side thrust force exerted by this distortion causes the movable supporting surface to move in a direction which would indicate toe-out. My invention makes it possible to overcome this distortional force by utilizing fore and aft distortional forces which are also caused by camber. They have been ignored on the type of movable platform which moves in a straight line, and have contributed to the side thrust force error on the pivoted runner board type of platform gage. They may be described as follows:

When a wheel is tipped away from vertical, by camber, the bottom of the tire is deformed in such a manner as to cause the wheel to have a somewhat cone-like action; the smaller end of the cone being at the outer edge of the tread. Due to this cone-like action, when such a wheel is rolled in a straight line, the outer edge of the tread tends to travel a lesser distance per revolution of the wheel than the inner edge of the tread. These different diameters tending to roll different distances per revolution of the wheel cause a forward force to be exerted on the supporting surface at the outer edge of the tread and a backward force to be exerted on the supporting surface at the inner edge of the tread. The type of platform gage that moves in a straight line is not responsive to these opposing forces, but, as they are exerted at points approximately the width of the tread apart, they have caused the pivoted runner-board type of gage to rotate about its pivoting point in a direction that would indicate toe-out, thereby contributing to the previously mentioned error caused by distortional side thrust forces. Thus it will be seen that camber exerts a side thrust force, and, entirely independent of this side thrust force, camber also exerts a twisting force on the supporting surface. On the pivoted runner-board type of gage the twisting force has a constant tendency to rotate the board about its pivoting point as the tire traverses the entire length of the board, but the side thrust force has a constantly varying tendency to rotate the board about its pivoting point as the wheel traverses the length of the board. I have found that at a predetermined distance from the pivoting point these two forces are approximately equal, each contributing an equal amount to the error. I have also found that by rolling the wheel in the opposite direction and preventing the platform from being responsive to horizontal forces excepting at a predetermined distance from the pivoting point I have been able to cause these forces to balance each other and therefore to cancel out the error or errors heretofore caused by either or both of these forces on the two types of platform gage hereinbefore described. I have found that different types of tread design cause a slight variation in the required distance from the pivotal point to that part of the supporting surface which is responsive to these forces, but by making the distance approximately midway between the two extremes required for a perfect balance of the forces a very close approximation of a perfect balance is obtained on all types of treads. If new tread design should be developed, or if either of the extremes previously mentioned should be abandoned it might be desirable to change the relative position of the pivotal point and therefore I do not confine myself to any specified distance.

Merely driving the car in the opposite direction over the type of pivoted platform which has been described as the runner-board type of gage would not overcome these errors because that area of the platform which has been responsive to lateral forces has extended to and over the pivoting point and as the wheel approaches the pivoting point the fore and aft forces would have a much greater tendency to rotate the platform about its pivoting point than the side thrust force would have to rotate it in the opposite direction. The consequent movement of the platform would be in a direction which would indicate toe-in when no toe-in existed. Therefore any adjustment made to comply with such a test would leave the wheels in a toed out condition, and it is a well known fact that toe-out causes very unsatisfactory steering in addition to causing excessive tire wear.

The constantly varying tendency for the side thrust forces to rotate a pivoted platform about its pivoting point has been another source of error. For instance when the wheel is near the pivoting point a given amount of distortion in the tire tends to move the indicator end of the board a much greater amount than it does as the wheel approaches the indicator end of the board. Furthermore there has been no certainty as to the distance from the pivoting point to the point where the distortional force will be strong enough to move the indicator end of the board. Movements have started to take place at various distances from the pivoting point and this in addition to the constantly changing ratios has eliminated all possibility of obtaining an accurate indication. My invention which provides means for and a method of causing the distortional forces to be restrained until the tire reaches a predetermined point remote from the pivotal point thereby overcomes both of the last mentioned errors.

I have also found that a considerable error has been caused by movement of the movable wheel-supporting surface as the tire rolls onto and off from same, and my invention also provides means to prevent this movement.

In the drawings Fig. 1 is a plan view of a device embodying my invention. Fig. 2 is an elevation of Fig. 1 and Fig. 3 is a section taken along line 3—3 of Fig. 1. Fig. 4 is a plan view of another device into which my invention is embodied. Fig. 5 is an elevation of Fig. 4 and Fig. 6 is a section taken along line 6—6 of Fig. 4.

Similar parts are designated by the same number in all of the drawings.

In the construction of the device, as shown in Fig. 1, No. 1 is a plate adapted to support a vehicle wheel. Said plate is mounted on ball bearings 3 which in turn are supported by base plate 5. No. 1 is adapted to rotate freely about pivot 7 within a limited range in a horizontal plane. No. 9 is a plate attached only at the outer end of base plate 5 and adapted to yield vertically in response to vehicle weight. No. 11 is a similar vertically yieldable plate attached to the opposite end of base plate 5. Nos. 13 and 15 are spacer blocks adapted to prevent vertical movement of plate 9 beyond a certain limit when said plate is traversed by a vehicle wheel. Nos. 17 and 19 are additional supports for plate 9 and they are also adapted to act as stops to prevent plate 1 from rotating about its pivoting point beyond certain limits. Nos. 21—23—25, and 26 are spacers to prevent the extension of plate 1 from yielding when plate 11 is traversed by a vehicle wheel. Nos. 27 and 29 are blocks to support that part of plate 11 which is not supported by the extension of plate 1 when plate 11 is caused to yield in response to vehicle weight. No. 31 is an indicator pivotally connected to plate 1. No. 33 is a link pivotally interconnected between base plate 5 and indicator 31. No. 35 is a scale adapted to register with indicator 31. No. 37 is an indicator mark which can be substituted for indicator 31. The dimension of the wheel-supporting surface on plate 1, in the direction of wheel travel, is equal to or greater than the length of the usual area of contact between a vehicle tire and its supporting surface. When plate 9 or plate 11 yields vertically in response to vehicle weight it is brought into frictional engagement with plate 1 to prevent horizontal movement of plate 1 while any part of the vehicle weight is supported by either plate 9 or plate 11; thus plate 1 is prevented from moving in response to distortional forces of a tire excepting while the wheel is at a predetermined distance from the pivotal point, thereby eliminating those errors due to the constantly changing ratios, the variations in the distances from the pivoting point to the points where movement starts to take place, and the error due to the movement of the plate as the wheel is rolled from the immediately adjacent surface onto the moveable wheel-supporting surface, and pivot 7 is set at a predetermined distance from the wheel-supporting surface of plate 1 in order that, when the wheel is rolled in the direction of the arrow, the distortional side thrust force at bottom center which tends to move the plate in one direction, and which is due to camber, will be off-set by the fore and aft forces which tend to move the plate in the opposite direction and which are also due to camber. Each of these forces is dependent on the amount of camber existing. If there is no camber neither of these forces will be present and therefore any indicated resultant force must be caused by toe-in or toe-out forces. Either of these forces will cause sideways scuffing of the tires because they are at their maximum at the point where road contact is about to break and the rubber resumes its normal shape before road contact is completely broken.

In Fig. 4 the constructional details differ slightly from those shown in Fig. 1 but the outstanding principle is identical in both. In Fig. 4 plate 1 is stabilized by bar 41 in order that the lateral distortions of a tire passing over plate 1 will be restrained in practically the same manner that they are restrained when rolling on an ordinary road surface. Bar 41 prevents plate 1 from moving any appreciable amount therefore plates 9 and 11 may or may not be vertically yieldable as frictional engagement between them and plate 1 is not necessary but would do no harm. Spacers 13—14 and 16 in Fig. 4 correspond to 13 and 15 in Fig. 1 excepting that spacers 14 and 16 are designed to carry bar 41. Spacers 17 and 19 are identical with those in Fig. 1. Spacers 43—45, and 47 correspond to spacers 21—23, and 25 except that they are designed to protrude up through an opening in the extension of plate 1 and to directly support plate 11 thereby making it unnecessary to have any support under the extension of plate 1.

The method of operation on Fig. 1 and Fig. 4 differs slightly. In Fig. 1 the wheel is rolled completely across plate 1, in the direction of arrow 39, and the indicator records any movement of plate 1, said movement being in response to the resultant lateral force exerted on its surface during the period in which it is not restrained by plate 9 or 11, while in Fig. 4 the reading is taken before the wheel leaves plate 1 because the recording remains only while the wheel is directly on plate 1.

With my invention the errors due to the constantly changing ratios and to the distortional forces dispelling themselves at various distances from the pivoting point are both eliminated regardless of whether the wheel travels in the direction of the arrow or in the opposite direction; but in order to oppose the camber side thrust forces by fore and aft forces which are also the result of camber the wheel must roll in the direction of the arrow.

It will be noted that the principal function of pivot 7 is to prevent lateral movement of that end of element 1 which is remote from the wheel-supporting surface and that a transverse link or a longitudinal track could perform this function while a longitudinal link or a transverse track at the opposite end of the element would prevent fore and aft movement of the element. Many other mechanical variations and forms of constructional details could be resorted to without departing from the spirit and scope of the invention.

I claim:—

1. Indicating apparatus comprising means to provide a path for a vehicle wheel, an element adapted to form a portion of said path and having a wheel-supporting surface, said element being adapted for rotary movement in a generally horizontal plane about a pivotal point remote from the wheel-supporting surface of the element but in the vicinity of the wheel path.

2. Indicating apparatus comprising means to provide a path for a vehicle wheel, an element adapted to form a portion of said path and having a wheel-supporting surface, said element being adapted for rotary movement in a generally horizontal plane about a pivotal point remote from the wheel-supporting surface of the element but in the vicinity of the wheel path, and means to indicate movement of said surface.

3. Indicating apparatus comprising means to provide a path for a vehicle wheel, an element adapted to form a portion of said path and having a wheel-supporting surface, said element being adapted for rotary movement in a generally horizontal plane about a pivotal point remote from the wheel-supporting surface of the element but in the vicinity of the wheel path, and means operable by vehicle weight to prevent movement of said element in response to distortional forces of a tire during a period in which the tire is only partly engaged by said element.

4. Indicating apparatus comprising means to provide a path for a vehicle wheel, an element adapted to form a portion of said path and having a wheel-supporting surface, said element being adapted for rotary movement in a generally horizontal plane about a pivotal point remote from the wheel-supporting surface of the element but in the vicinity of the wheel path, means operable by vehicle weight to prevent movement of said element in response to distortional forces of a tire during a period in which the tire is only partly engaged by said element, and means to indicate movement of said surface.

5. Indicating apparatus comprising means providing a path for a vehicle wheel, an element adapted to form a portion of said path and having a wheel-supporting surface, said element being adapted for rotary movement in a generally horizontal plane about a pivotal point remote from the wheel-supporting surface of the element but in the vicinity of the wheel path, means to prevent appreciable rotary movement of said surface and thereby to restrain distortional forces in a tire rolling on the element in practically the same manner as they are restrained when traveling on an ordinary road surface, and means to indicate when the resultant of said distortional forces tends to move said element about said pivotal point.

6. Indicating apparatus comprising means to provide a path for a vehicle wheel, an element adapted to form a portion of said path and having a wheel-supporting surface, said element being adapted for rotary movement in a generally horizontal plane about a pivotal point remote from its wheel-supporting surface and in the vicinity of the wheel path, at least one vertically yieldable member associated with said base and adapted to come into frictional engagement with the previously mentioned element when said vertically yieldable member is traversed by a vehicle wheel.

7. Indicating apparatus comprising means to provide a path for a vehicle wheel, an element adapted to form a portion of said path and having a wheel-supporting surface, said element being adapted for rotary movement in a generally horizontal plane about a pivotal point remote from the wheel-supporting surface of the element but in the vicinity of the wheel path, means adapted to render the wheel supporting surface of the element non-responsive to distortional forces in a tire as the wheel rolls onto or off from said surface, said means being adapted to automatically become inoperative when the wheel is at a predetermined distance from the pivoting point of the element.

8. Indicating apparatus comprising an element adapted to form a portion of a path for a vehicle wheel, said element provided with a wheel-supporting surface and an extension therefrom, a portion of said extension being adapted to function with a fulcrum which is so positioned with respect to the wheel-supporting surface that when a wheel is rolled over the element in a predetermined direction any lateral camber forces tending to move the surface in one direction will be opposed by fore and aft camber forces which tend to move the surface in the opposite direction.

9. An indicating apparatus comprising an element to form a portion of a path for a vehicle wheel, anti-frictional means adapted to support said element, means to prevent a portion of the element from moving laterally with respect to the path of wheel travel, said portion being so positioned with respect to the wheel-supporting surface that when a wheel is rolled over the element in a predetermined direction any lateral camber forces tending to move the surface in one direction will be opposed by fore and aft camber forces which tend to move the surface in the opposite direction.

10. Means providing a supporting surface for a wheel as it revolves on its axis, an element adapted to form a part of said surface, said element having a wheel-supporting area, said element being adapted for rotary movement in a generally horizontal plane about a pivotal point remote from the wheel-supporting area of the element but in the vicinity of that portion of the surface over which the wheel is adapted to roll, and means to indicate movement of said area.

11. Means for utilizing fore and aft distortional forces which are caused by camber to oppose side thrust forces which are also caused by camber, while making a wheel alignment test, which consists in means adapted to support a revolving wheel, a predetermined portion of said means being adapted for rotary movement in a generally horizontal plane and about a point remote from said portion, said point being so positioned with respect to said portion as to cause said forces to oppose each other with respect to their individual tendencies to rotate said portion about said pivoting point.

12. Indicating apparatus comprising means providing a path for a vehicle wheel, a portion of said path being responsive within predetermined limits to horizontal forces exerted thereon, said portion having a pivotal point remote therefrom, means operable by vehicle weight to render said portion nonresponsive to horizontal forces exerted by a wheel rolling on said path excepting when the wheel is at a predetermined distance from said pivoting point.

13. Indicating apparatus comprising means providing a path for a vehicle wheel, a portion of said means being responsive within predetermined limits to horizontal forces exerted by a wheel rolling thereon, said portion having a pivotal point so positioned with respect to the portion that when a tire rolls in a predetermined direction over the portion any fore and aft forces which are due to camber, and which tend to twist the portion about its pivotal point in one direction, will be substantially opposed by a sidethrust force which is also due to camber and which tends to twist the portion about its pivotal point in the opposite direction, and means to indicate when the resultant of all distortional forces exerted on said portion tends to move said portion about said pivotal point.

JOHN FABIEN DUBY.